US012634828B2

(12) United States Patent
Kragten et al.

(10) Patent No.: US 12,634,828 B2
(45) Date of Patent: May 19, 2026

(54) MULTIMODE RADIO ACCESS TECHNOLOGY CONTROL BASED ON POWER AND PERFORMANCE CONSIDERATIONS

(71) Applicant: GOOGLE LLC, Mountain View, CA (US)

(72) Inventors: Blake Kragten, San Diego, CA (US); Ning Zhang, Saratoga, CA (US); Madhusudan Kinthada Venkata, San Diego, CA (US); Shivank Nayak, Milpitas, CA (US); Jibing Wang, San Jose, CA (US); Siddharth Ray, Sunnyvale, CA (US); Qin Zhang, Mountain View, CA (US); Srinivas Vangaru, Dublin, CA (US); Sathish Karunakaran, Los Altos, CA (US); Xiantao Sun, Cupertino, CA (US); Simon Hsieh, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 576 days.

(21) Appl. No.: 17/921,264

(22) PCT Filed: Jun. 2, 2021

(86) PCT No.: PCT/US2021/035517
§ 371 (c)(1),
(2) Date: Oct. 25, 2022

(87) PCT Pub. No.: WO2021/247753
PCT Pub. Date: Dec. 9, 2021

(65) Prior Publication Data
US 2023/0180131 A1 Jun. 8, 2023

Related U.S. Application Data

(60) Provisional application No. 63/033,620, filed on Jun. 2, 2020.

(51) Int. Cl.
H04W 52/02 (2009.01)
H04W 28/02 (2009.01)
H04W 88/06 (2009.01)

(52) U.S. Cl.
CPC ............................... *H04W 52/0261* (2013.01)

(58) Field of Classification Search
CPC ............................................... H04W 88/00–06
See application file for complete search history.

(56) References Cited

U.S. PATENT DOCUMENTS 9,295,095 B2 3/2016 Rayavarapu
10,278,108 B2 4/2019 Shaw et al.
(Continued)

FOREIGN PATENT DOCUMENTS

CN 103167589 A 6/2013
CN 105338585 A 2/2016
(Continued)

OTHER PUBLICATIONS

Communication pursuant to Article 94(3) EPC mailed Nov. 28, 2024 for EP Application No. 21735530.4, 5 pages.
(Continued)

*Primary Examiner* — San Htun

(57) ABSTRACT

A user equipment (UE) employing different radio access technologies (RATs) concurrently or successively provides the UE the opportunity to select a particular RAT to support an access service used by one or more software applications of the UE. A RAT operational control scheme provides for opportunistic enablement and disablement of a RAT and/or intra-RAT configuration so as to provide sufficient uplink and downlink throughput for supported software applications while reducing unnecessary power consumption by the UE, which often is battery powered.

10 Claims, 9 Drawing Sheets

(56) References Cited

U.S. PATENT DOCUMENTS

| | | | | |
|---|---|---|---|---|
| 10,462,793 | B2 | 10/2019 | Kweon et al. | |
| 10,512,010 | B2 | 12/2019 | Aqiwal et al. | |
| 2012/0224563 | A1* | 9/2012 | Zisimopoulos | H04W 36/144 |
| | | | | 455/435.2 |
| 2012/0322504 | A1 | 12/2012 | Chou et al. | |
| 2014/0133375 | A1 | 5/2014 | McDiarmid et al. | |
| 2015/0341945 | A1* | 11/2015 | Panchal | H04L 5/0098 |
| | | | | 370/329 |
| 2016/0100360 | A1 | 4/2016 | Liu et al. | |
| 2017/0201366 | A1 | 7/2017 | Chamorro et al. | |
| 2017/0289906 | A1 | 10/2017 | Tamura et al. | |
| 2018/0139672 | A1 | 5/2018 | Yang et al. | |
| 2018/0295552 | A1 | 10/2018 | Chakraborty et al. | |
| 2019/0069205 | A1 | 2/2019 | Lee et al. | |
| 2019/0101970 | A1 | 4/2019 | Ge et al. | |
| 2019/0166553 | A1 | 5/2019 | Ryoo et al. | |
| 2019/0297569 | A1* | 9/2019 | Arora | H04W 72/23 |
| 2019/0387561 | A1* | 12/2019 | Paladugu | H04B 7/0628 |
| 2020/0053616 | A1 | 2/2020 | Zhu et al. | |
| 2020/0059935 | A1 | 2/2020 | Qian et al. | |
| 2020/0092844 | A1 | 3/2020 | Lin et al. | |
| 2020/0351792 | A1* | 11/2020 | Ghelichi | H04W 52/0277 |
| 2021/0185753 | A1 | 6/2021 | Mattam et al. | |
| 2021/0345454 | A1* | 11/2021 | Dhanapal | H04W 76/27 |
| 2022/0095217 | A1* | 3/2022 | Shi | H04W 40/12 |
| 2022/0377610 | A1* | 11/2022 | Garcia | H04L 5/0062 |

FOREIGN PATENT DOCUMENTS

| | | |
|---|---|---|
| CN | 105430726 B | 5/2018 |
| CN | 110149680 A | 8/2019 |
| CN | 110381536 A | 10/2019 |
| CN | 110753389 A | 2/2020 |
| EP | 2557859 A1 | 2/2013 |
| EP | 2605558 A1 | 6/2013 |
| EP | 2713656 A2 | 4/2014 |
| EP | 3136789 A1 | 3/2017 |
| EP | 3167671 A1 | 5/2017 |
| EP | 3203783 A1 | 8/2017 |
| EP | 3448114 A1 | 2/2019 |
| EP | 3468292 A1 | 4/2019 |
| EP | 3557941 A1 | 10/2019 |
| EP | 3769580 B1 | 12/2024 |
| KR | 20110048779 A | 5/2011 |
| KR | 20190067926 A | 6/2019 |
| WO | 2013123429 A2 | 8/2013 |
| WO | 2014186062 A1 | 11/2014 |
| WO | 2016005765 A1 | 1/2016 |
| WO | 2016032855 A1 | 3/2016 |
| WO | 2017088521 A1 | 6/2017 |
| WO | 2017190232 A1 | 11/2017 |
| WO | 2018174662 A1 | 9/2018 |
| WO | 2019088364 A1 | 5/2019 |
| WO | 2019095254 A1 | 5/2019 |
| WO | 2020091546 A1 | 5/2020 |
| WO | 2020223347 A1 | 11/2020 |
| WO | 2017202183 A1 | 11/2021 |

OTHER PUBLICATIONS

Translation of Notification of Third Office Action mailed Dec. 30, 2024 for CN Application No.202080006701.X, 8 pages.
Communication pursuant to Article 94(3) EPC mailed May 8, 2023 for EP 20747216.8, 4 pages.
Notice of Allowance mailed May 10, 2024 for U.S. Appl. No. 17/416,796, 36 pages.
Translation of Notification of First Office Action mailed Oct. 16, 2023 for CN Application No. 202080006701.X, 21 pages.
International Preliminary Report on Patentability mailed Dec. 15, 2022 for International Application No. PCT/US2021/035517, 30 pages.
International Search Report and Written Opinion mailed Sep. 14, 2020 for International Application No. PCT/US2020/035849, 14 pages.
International Preliminary Report on Patentability mailed Dec. 23, 2021 for International Application No. PCT/US2020/035849, 8 pages.
International Search Report and Written Opinion mailed Jan. 21, 2022 for International Application No. PCT/US2021/035517, 39 pages.
Invitation to Pay Additional Fees and Partial Search Report mailed Sep. 27, 2021 for International Application No. PCT/US2021/035517, 19 pages.
miui.net, "MIUI 11 Ultra Power Saving Mode on Any Xiaomi Device—Download Apk"; Aug. 4, 2019, 10 pages.
GSM Association, "5G Implementation Guidelines: NSA Option 3," Mar. 28, 2019, 26 pages.
Wan, L. et al., "Enabling Efficient 5G NR and 4G LTE Coexistence," IEEE Wireless Communications, Feb. 2019, 3 pages.
GTI Group, "GTI Sub-6GHz 5G Device White Paper," https://www.gtigroup.org/d/file/Resources/rep/2018-02-22/c9d31709d72643e625321d6f3724d761.pdf, CMCC et al., Jan. 1, 2018, 82 pages.
Non-Final Office Action mailed Dec. 19, 2023 for U.S. Appl. No. 17/416,796, 15 pages.
Translation of Notification of The Second Office Action mailed Jun. 28, 2024 for CN Application No. 202080006701.X, 15 pages.
Translation of Notification for Patent Registration Formalities mailed May 30, 2025 for CN Application No. 202080006701.X, 6 pages.
Communication pursuant to Article 94(3) EPC mailed Oct. 22, 2025, 6 pages.

* cited by examiner

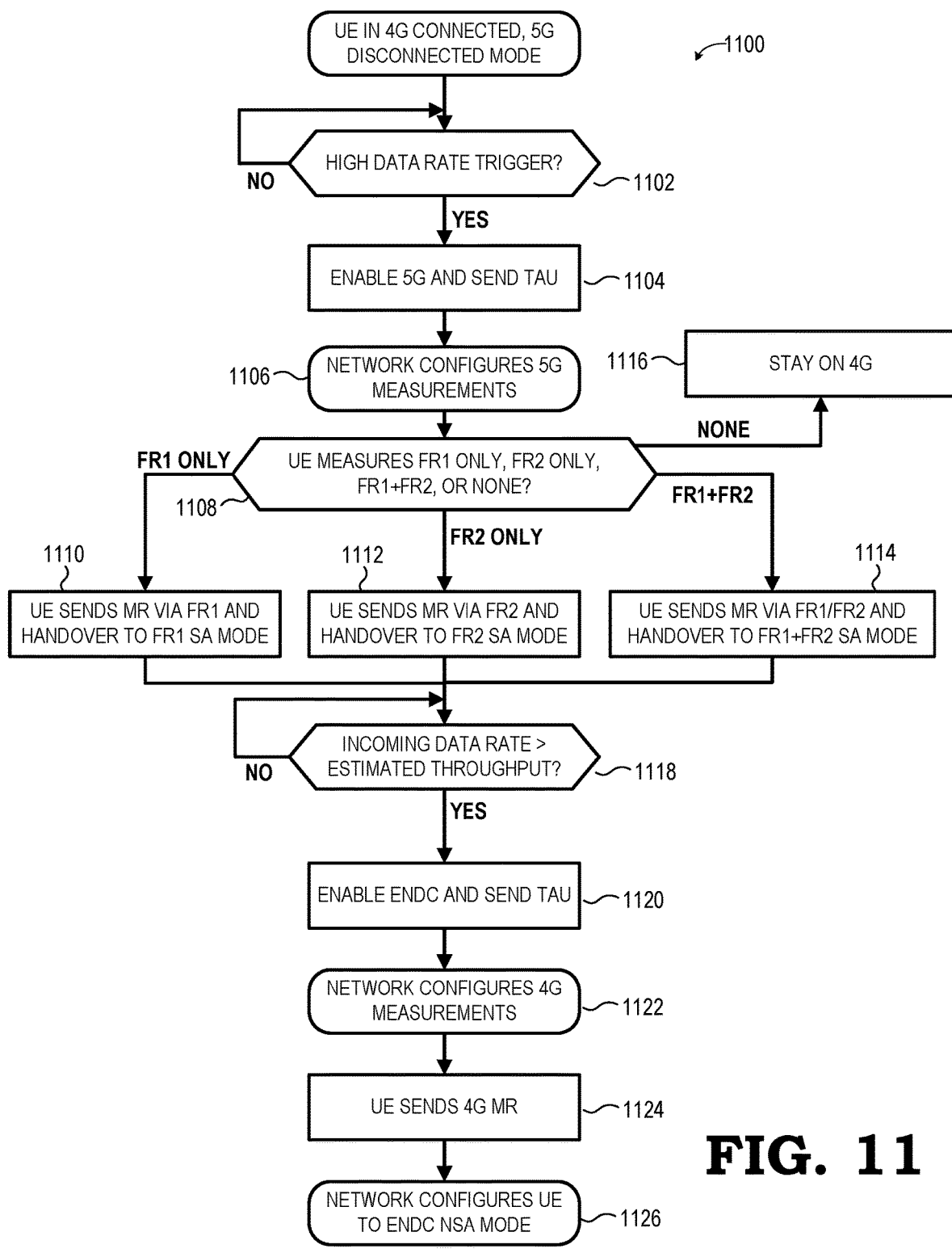

UE IN 4G CONNECTED, 5G DISCONNECTED MODE

1100

HIGH DATA RATE TRIGGER?  1102

NO

YES

ENABLE 5G AND SEND TAU  1104

1106  NETWORK CONFIGURES 5G MEASUREMENTS

1116  STAY ON 4G

NONE

FR1 ONLY  UE MEASURES FR1 ONLY, FR2 ONLY, FR1+FR2, OR NONE?  FR1+FR2

1108

FR2 ONLY

1110  UE SENDS MR VIA FR1 AND HANDOVER TO FR1 SA MODE

1112  UE SENDS MR VIA FR2 AND HANDOVER TO FR2 SA MODE

1114  UE SENDS MR VIA FR1/FR2 AND HANDOVER TO FR1+FR2 SA MODE

INCOMING DATA RATE > ESTIMATED THROUGHPUT?  1118

NO

YES

ENABLE ENDC AND SEND TAU  1120

NETWORK CONFIGURES 4G MEASUREMENTS  1122

UE SENDS 4G MR  1124

NETWORK CONFIGURES UE TO ENDC NSA MODE  1126

FIG. 11

MULTIMODE RADIO ACCESS TECHNOLOGY CONTROL BASED ON POWER AND PERFORMANCE CONSIDERATIONS

CROSS-REFERENCE TO RELATED APPLICATIONS

The present application is a U.S. National Stage under 35 U.S.C. § 371 of International Patent Application Serial No. PCT/US2021/035517, entitled "MULTIMODE RADIO ACCESS TECHNOLOGY CONTROL BASED ON POWER AND PERFORMANCE CONSIDERATIONS" and filed on Jun. 2, 2021, which claims priority to U.S. Provisional Application No. 63/033,620, entitled "MULTI-MODE RADIO ACCESS TECHNOLOGY CONTROL BASED ON POWER AND PERFORMANCE CONSID-ERATIONS" and filed on Jun. 2, 2020, the entireties of which are incorporated by reference herein.

BACKGROUND

Cellular phones and other mobile user equipment (UE) often are configured to utilize multiple radio access technologies (RATs) in order to successively or concurrently connect to different radio access networks (RANs) in support of one or more access services. However, the RATs often provide different performance and power profiles in a given situation. For example, a millimeter-wave (mmWave) implementation of a Fifth Generation (5G) New Radio (NR) RAT often, but not always, provides higher uplink and downlink throughputs at the cost of higher power consumption than a Fourth Generation (4G) Long Term Evolution (LTE) RAT. Accordingly, ineffective selection between RATs available to support an access service for one or more software applications of a UE, or the ineffective configuration of a given RAT at the UE, can lead to one or both of unnecessary power consumption or insufficient data throughput, either of which can lead to an unsatisfactory user experience.

SUMMARY OF EMBODIMENTS

A UE can be configured to perform particular operations or actions by virtue of having instructions in the form of software, firmware, hardware, or a combination of them installed and which, when executed, manipulate the UE to perform the actions. These actions are described below in accordance with various general and specific aspects. Implementations of the described techniques may include hardware, a method or process, or computer software on a computer-accessible medium One general aspect includes a method for selectively maintaining a RAT in an enabled state at a UE for accessing a service. The method includes determining whether a display of the UE is active or inactive and, responsive to determining the display is active, maintaining the RAT in an enabled state, or responsive to determining the display is inactive comparing a receive throughput of the UE to a specified receive threshold and comparing a transmit throughput of the UE to a specified transmit threshold. The method also can include, responsive to both the receive throughput being less than the receive threshold and the transmit throughput being less than the transmit threshold, maintaining the RAT in the enabled state. Other embodiments of this aspect include corresponding computer systems, apparatus, and computer programs recorded on one or more computer storage devices, each configured to perform the actions of the methods. Implementations of this method may include one or more of the following features. The method may include responsive to determining the display is inactive and responsive to either the receive throughput exceeding the receive threshold or the transmit throughput exceeding the transmit threshold, configuring the RAT into a disabled state. At least one of the receive throughput or the transmit throughput is an instantaneous throughput. At least one of the receive threshold or the transmit threshold is a fixed threshold set by a user, a manufacturer, or a network operator. The RAT is one of a Fifth Generation New Radio (5G NR) RAT or a Fourth Generation Long Term Evolution (4G LTE) RAT.

Another general aspect includes a method for selectively disabling a first RAT when entering a battery saving mode at a UE. The method includes preventing disablement of the first RAT when entering the battery saving mode responsive to determining at least one of a coverage associated with a second RAT of the UE is insufficient and a data throughput of the second RAT is less than a specified threshold, a software application authorized to solely utilize the first RAT is executing at the UE, or a transmit power consumption of the first RAT is less than a transmit power consumption of the second RAT. Implementations of this method may include one or more of the following features. Entering the battery saving mode may include at least one of setting an upper bound based on utilized capacity of a processor of the UE, setting an upper bound based on display brightness of a display of the UE, or setting an upper bound based on RAT measurement frequencies at the UE. The method may include determining the coverage associated with the second RAT is insufficient is based on a comparison of at least one measurement to a corresponding threshold, the at least one measurement including a measurement of at least one of a received signal strength indicator (RSSI) measurement, a reference signal received power (RSRP) measurement, a reference signal received quality (RSRQ) measurement, a signal-to-noise (SNR) measurement, or a physical broadcast channel (PBCH) bit error rate. The corresponding threshold is set by a user, a manufacturer, or a network operator. The first RAT is a 5G NR RAT and the second RAT is a 4G LTE RAT.

An additional general aspect includes a method for selectively disabling a RAT at a UE. The method includes determining a data rate of the UE based on an analysis of a data traffic usage pattern of the UE, filtering the data rate with one or more previous data rates using a filtering window to generate a filtered data rate, and selectively disabling the RAT based on a comparison of the filtered data rate and a corresponding specified threshold. Implementations of this method may include one or more of the following features. The analysis of the data traffic usage pattern includes monitoring an operation of at least one software application of the UE for periodic network activities. The corresponding specified threshold is a fixed threshold set by a user, a manufacturer, or a network operator. The RAT is one of a 5G NR RAT or a 4G LTE RAT. The corresponding specified threshold is set relative to a throughput capacity of a radio access network (RAN) accessed via the RAT. The analysis of the data traffic usage pattern includes monitoring historical data usage patterns of the UE that are correlated to either or both of time and location.

One general aspect includes a method for selectively disabling a first RAT during a dual-connectivity mode at a UE. The method includes determining an average downlink data rate for a second RAT used in the dual-connectivity mode based on average downlink statistics obtained from at least one of multiple network operators, multiple vendors, multiple regions, and multiple research organizations, determining a signal-to-noise (SNR) scale ratio based on a ratio of a current SNR value for the second RAT measured at the UE to a maximum SNR for the second RAT, determining a network load ratio based on a ratio of a current broadband received signal strength indicator (RSSI) to an inband RSSI for the second RAT of the UE, determining a scaled average downlink data rate based on the average downlink data rate, the SNR scale ratio, and the network load ratio, and selectively disabling the first RAT based on a comparison of a total downlink throughput of the first RAT and the second RAT to the scaled average downlink data rate. Implementations of this method may include one or more of the following features. The method may include categorizing average downlink statistics, and where determining the average downlink data rate may include determining the average downlink data rate for categorized downlink statistics associated with one or more characteristics of the second RAT. Selectively disabling the first RAT may include responsive to the total downlink throughput being less than the scaled average downlink data rate over a sliding window, disabling the first RAT, and responsive to the total downlink throughput being at least equal to the scaled average data rate over the sliding window, maintaining the first RAT as enabled. The first RAT is a 5G NR RAT and the second RAT is a 4G LTE RAT.

Another general aspect includes a method for opportunistically configuring capabilities of a first RAT of a UE implementing the first RAT and a second RAT. The method includes, responsive to detecting a low data throughput condition while the first RAT and second RAT are enabled, selectively disabling one or more capabilities of the first RAT, the one or more capabilities including at least one of an intra-band carrier aggregation capability, an inter-band carrier aggregation capability, or a component carrier, and responsive to detecting a high data throughput condition while the first RAT is disabled and the second RAT is enabled enabling the first RAT, and responsive to determining that a data rate requirement of the UE is greater than an estimated throughput of the first RAT, configuring the first RAT to operate in a dual-connectivity mode with the second RAT. Implementations of this method may include one or more of the following features. Selectively disabling one or more capabilities may include selectively disabling an intra-band carrier aggregation capability. The first RAT is a 5G NR RAT and the second RAT is a 4G LTE RAT. Selectively disabling one or more capabilities may include selectively disabling an inter-band carrier aggregation capability. Selectively disabling one or more capabilities may include selectively disabling a component carrier.

In yet another aspect, a UE may include at least one antenna array, two or more modems coupled to the at least one antenna array, each of the two or more modems supporting a corresponding RAT, a processor coupled to the two or more modems, and a memory storing instructions configured to manipulate one or more of the two or more modems or the processor to perform any of the methods above.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

FIGS. 10 and 11 are flow charts illustrating an adaptive RAT scaling mode of the RAT operational control scheme in accordance with some embodiments.

DETAILED DESCRIPTION

The ability to employ different RATs concurrently or successively at a multimode UE provides the UE the opportunity to select a particular RAT to support an access service (e.g., data or Voice-over-Internet Protocol (VoIP)) used by one or more software applications of the UE. The present disclosure describes embodiments of systems and methods for a RAT operational control scheme to provide for efficient opportunistic enabling or disabling of a RAT or dynamic reconfiguration of a RAT so as to provide sufficient uplink and downlink throughput for supported software applications while reducing unnecessary power consumption by the UE, which often is battery powered.

For ease of illustration, the following techniques are described in an example context in which the multiple RATs supported by a UE include at least a first RAT that is compliant with a 5G NR standard (e.g., Third Generation Partnership Project (3GPP) Release 15, 3GPP Release 16, etc.) and a second RAT that is compliant with a 4G standard, and more specifically, a 4G LTE standard (e.g., 3GPP Release 8, 3GPP Release 9, etc.). In this example context, a 5G RAT typically provides for faster uplink and downlink throughputs and lower latencies than a 4G LTE RAT but requires more power in both active transmission mode and standby mode than a 4G LTE RAT. However, in some circumstances the 4G LTE RAT may provide a greater uplink or downlink throughput, lower latencies, or may consume more power than the 5G RAT. As such, the management of operation of a 5G RAT at a UE in favor of a 4G LTE RAT, or vice versa, or the inter-RAT management of a 5G RAT itself, effectively illustrate aspects of the techniques described below. However, it should be understood that the present disclosure is not limited to a 4G RAT/5G RAT configuration, but rather the techniques described herein can be applied to any combination of different RATs employed at the same UE and which exhibit at least some disparity in throughput, latency, and/or power consumption. Accordingly, reference herein to a 5G RAT applies equally to a first RAT of a UE that typically provides for higher data throughput and/or lower latencies at a higher power level relative to a second RAT, while reference to a 4G RAT applies equally to a second RAT of the UE that typically provides for lower data throughput and/or higher latencies at a lower power level relative to the first RAT of the UE. Moreover, various references are made herein to a comparison of a value to a threshold. Unless otherwise noted, this threshold can be fixed or otherwise specified by a user, a network operator, a provider of the UE or other entity, or determined dynamically based on one or more parameters or conditions specified by the same or different entity.

Figure 1:
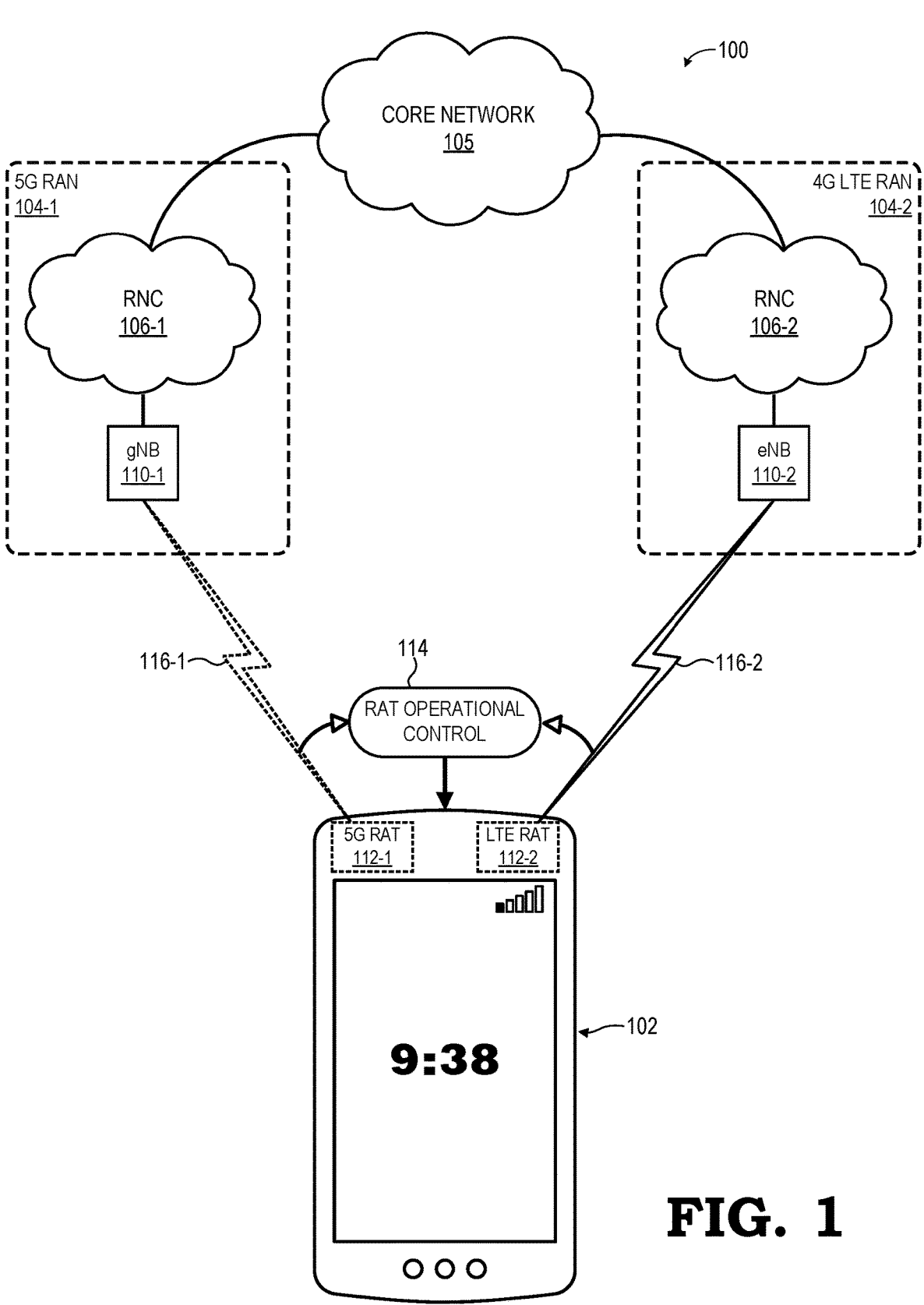
FIG. 1 is a block diagram illustrating a mobile cellular system having a UE employing a RAT operational control scheme in accordance with some embodiments.

FIG. 1 illustrates a mobile cellular system 100 utilizing an opportunistic RAT operational control in accordance with some embodiments. As shown in FIG. 1, the mobile cellular system 100 includes a user equipment (UE) 102 and one or more radio access networks (RANs) 104, such as a RAN 104-1 accessible using a 5G RAT and a RAN 104-2 accessible using a 4G LTE RAT (and thus referred to herein as "5G RAN 104-1" and "4G LTE RAN 104-2", respectively). Each RAN 104 is connected to one or more other RANs 104 via at least one core network 105, such as the Internet, via one or more private interconnecting data networks, or a combination thereof. The UE 102 can include any of a variety of wireless communication devices, such as a cellular phone, a cellular-enabled tablet computer or cellular-enabled notebook computer, an automobile or other vehicle employing cellular services (e.g., for navigation, provision of entertainment services, in-vehicle mobile hotspots, etc.), and the like.

Each RAN 104 includes a radio network controller (RNC) 106 connected to one or more base stations (BSs) 110 operable to wirelessly communicate with UEs within signal range based on one or more corresponding RATs, with each base station 110 defining a "cell" of coverage for the corresponding RAN 104. For ease of illustration, FIG. 1 depicts a single base station 110 in each RAN 104, but it will be appreciated that a typical implementation of a RAN 104 includes a number of base stations 110. Consistent with the terminology employed by the 5G NR standard, a base station 110-1 employed in the 5G RAN 104-1 is also referred to herein as "5G NodeB 110-1" or "gNB 110-1". Likewise, consistent with the terminology employed by the 4G LTE standard, a base station 110-2 employed in the 4G LTE RAN 104-2 is also referred to herein as "extended NodeB 110-2" or "eNB 110-2". As is well known in the art, the base stations 110 operate as an "air interface" so as to establish radio frequency (RF) wireless connections with UEs, and these wireless connections (or "links") then serve as data and voice paths between the UEs and the core networks 106 for providing various services to the UEs, including voice services via circuit-switched networks or packet-switched networks, messaging services such as simple messaging service (SMS) or multimedia messaging service (MMS), multimedia content delivery, presence services, and the like.

In at least one embodiment, the UE 102 is a multimode UE; that is, the UE 102 is capable of employing multiple RATs 112, either concurrently or successively, to access one or more services of one or more RANs 104 in support of software applications executing at the UE 102. In the example embodiment of FIG. 1, the UE 102 supports a first RAT 112-1 for accessing the 5G RAN 104-1 via the gNB 110-1 and a second RAT 112-2 for accessing the 4G LTE RAN 104-2 via the eNB 110-2. Accordingly, the first RAT 112-1 and the second RAT 112-2 are also referred to herein as "5G RAT 112-1" and "4G LTE RAT 112-2", respectively. Generally, a connection to the 5G RAN 104-1 via the 5G RAT 112-1 provides the UE 102 higher uplink and downlink throughputs and lower latencies but at the cost of higher power consumption, particularly when mmWave-based 5G is employed. Conversely, a connection to the 4G LTE RAN 104-2 via the 4G LTE RAT 112-2 provides the UE 102 lower uplink and downlink throughputs but requires less power both while active and idle compared to the 5G RAT 112-1. However, this relationship does not always hold true; in some situations, such as when the eNB 110-2 is particularly distant from the UE 102 or there otherwise is interference in the RF band employed for the 4G LTE RAT 112-2, the 4G LTE RAT 112-2 could in fact require the same, or even more, power consumption than the 5G RAT 112-1 under the same conditions. Likewise, the 5G RAT 112-1 is particularly susceptible to blockage by bodies, buildings and other structures (and particularly for mmWave), and thus the 5G RAT 112-1 may be unable to provide a higher throughput than the 4G LTE RAT 112-2 in similar circumstances.

Accordingly, in at least one embodiment the UE 102 employs a RAT operational control scheme 114 to opportunistically employ selective enablement and disablement of a RAT for providing access to one or more services for supporting applications at the UE 102 and/or to employ selective intra-RAT reconfiguration so as to leverage the current operational status and characteristics of the UE 102, the current operational characteristics of the RATs 112-1 and 112-2 and the wireless links 116-1 and 116-2, respectively, established therewith to provide a suitable combination of throughput, latency, and power consumption in support of the executing applications.

Figure 2:
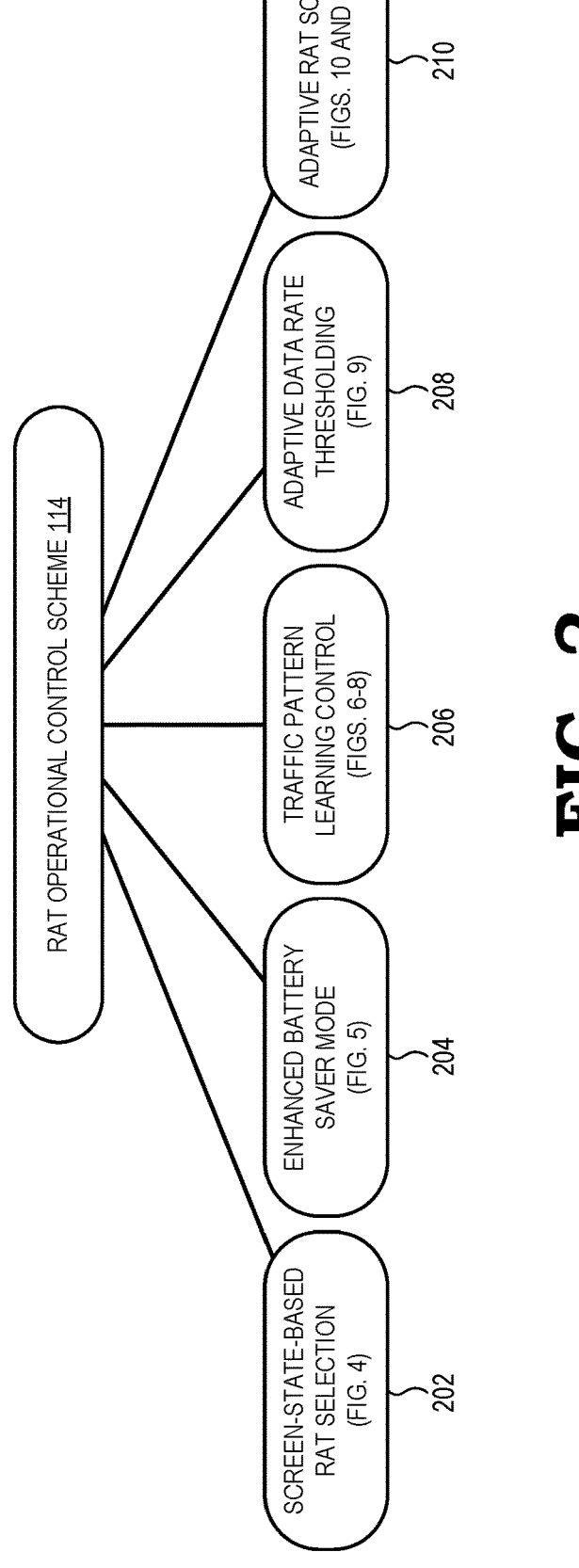
FIG. 2 is a block diagram illustrating example modes of the RAT operational control scheme employed by the UE of FIG. 1 in accordance with some embodiments.
Figure 3:
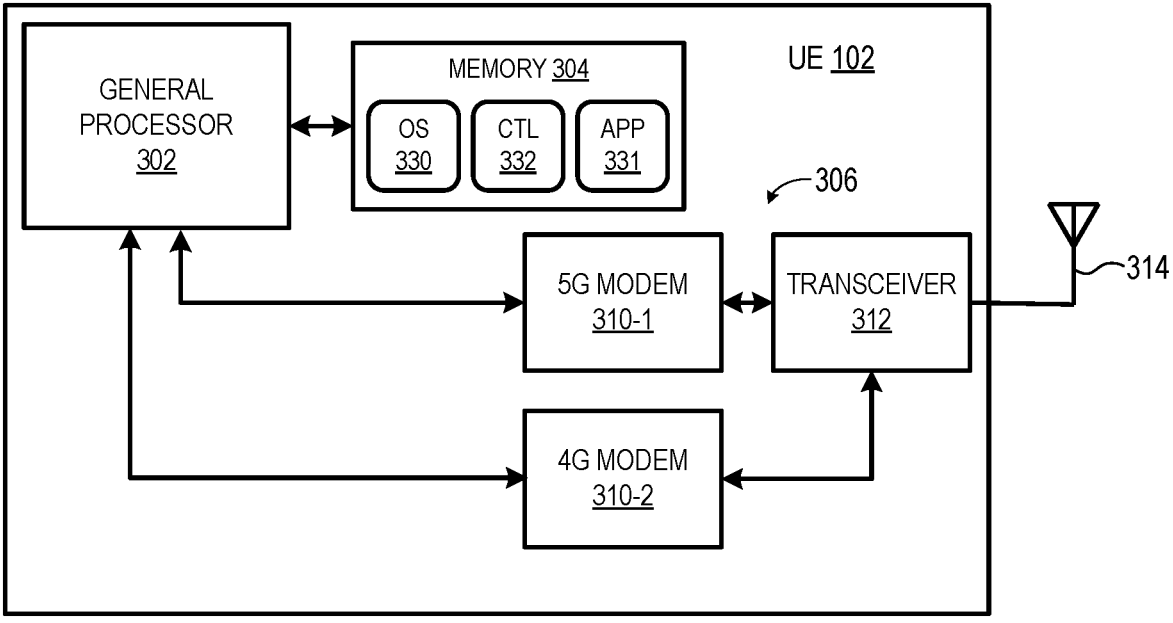
FIG. 3 is a block diagram illustrating an example implementation of the UE of FIG. 1 in accordance with some embodiments.

FIG. 2 illustrates various example modes employed singularly or in various combinations by the UE 102 as part of the RAT operational control scheme 114 in accordance with some embodiments. One such mode includes a screen-state-based RAT selection mode 202 in which a state of a display screen of the UE 102 is considered in selecting a RAT for supporting access to a service. This mode is described in greater detail below with reference to FIG. 4. Another mode includes an enhanced battery saver mode 204 in which entry into a battery saver mode supported by the UE 102 is selectively bypassed based on various conditions of the RATs 112 and the UE 102 itself. This mode is described in greater detail below with reference to FIG. 5. Yet another mode supported by the RAT operational control scheme 114 includes a traffic pattern learning control mode 206 in which data traffic patterns are learned and a filtering window is applied to selectively switch one RAT on and off in favor of at least one other RAT. This mode is described in greater detail below with reference to FIGS. 6-8. A further example includes an adaptive data rate thresholding mode 208 in which various broad metrics are collected and utilized to scale a threshold that is applied in selectively enabling a particular RAT. This mode is described in greater detail below with reference to FIG. 9. As yet another example, the RAT operational control scheme 114 can employ an adaptive RAT scaling mode 210 in which the capabilities of a particular RAT can be scaled in view of observed conditions. This mode is illustrated in greater detail below with reference to FIGS. 10 and 11. Note that the RAT operational control scheme 114 can implement one of these modes, all of these modes, or a combination of some subset thereof. FIG. 3 illustrates an example hardware configuration for the UE 102 implementing the RAT operational control scheme 114 in accordance with some embodiments. In the depicted example, the UE 102 includes a central processing unit (CPU) or other general processor 302, a system memory 304, and one or more radio resources 306. The radio resource 306 includes at least one modem 310, at least one transceiver 312, and at least one antenna array 314 suitable for RF signaling and signal processing in one or more frequency bands typically associated with cellular RATs. In the illustrated embodiment, the 5G RAT 112-1 and the 4G LTE RAT 112-2 share the same radio, and thus the radio resource 306 includes a 5G modem 310-1 for operating the transceiver 312 and the one or more antenna arrays 314 at frequency bands and with signal structure and protocol in accordance with at least one 5G NR standard, as well as a 4G modem 310-2 for operating the transceiver 312 and the one or more antenna arrays 314 at frequency bands and with signal structure and protocol in accordance with at least one 4G LTE standard. In other embodiments, the 5G RAT 112-1 and 4G LTE RAT 112-2 each have a separate radio, and thus include one transceiver 312 and antenna array 314 for the 5G RAT 112-1 and a separate transceiver 312 and antenna array 314 for the 4G LTE RAT 112-2. Further, it will be appreciated that the UE 102 can include a number of additional components omitted from FIG. 3 for ease of illustration, including, for example, one or more displays, one or more touchscreens, keypads, mice, touchpads, microphones, speakers, and other user input/output devices, one or more sensors, batteries or other power sources, graphical processing units (GPUs) or other coprocessors, and the like.

As a general operational overview, the general processor 302 executes executable instructions from a software stack that includes an operating system (OS) 330 (also commonly referred to as a "kernel") and one or more user software applications 331, and which further can include the protocol stacks executed by processors of the modems 310-1 and 310-2. The OS 330, through manipulation of the processor 302, manages the general operation of the various hardware components of the UE 102 as well as to support the execution of the one or more user software applications 331, with the executable instructions representing the OS 330 and the user software application 331 typically accessed from system memory 304 for execution by the general processor 302. During execution, one or more processes of the OS 330 or the user software application 331 may seek to wirelessly communicate with a component in the mobile cellular system 100 (FIG. 1), such as with a server, a gateway, another UE, and the like, with these processes referred to herein as "local processes."

In the event that a local process is seeking to use a cellular connection, the OS 330 coordinates with the radio resource to establish a cellular connection with one or both of the RANs 104-1 and 104-2 using the corresponding RAT 112. To this end, each modem 310 stores a protocol stack (not shown) storing executable instructions that, when executed by a baseband processor (not shown) of the modem 310, manipulate the baseband processor to perform various operations in accordance with a RAT protocol or other communication protocol associated with the air interface provided by the corresponding base station 110 via the transceiver 312 and antenna array 314. As is well known, such operations typically are associated with the lower-level layers of a network protocol, such as some or all of the physical, data link, and network layers, while the OS 330 and the user software application 331 support the higher-level layers of the network protocol, such as the transport, session, presentation, and application layers.

In many situations, the service sought to be utilized by a local process of the UE can be supported by any of multiple RANs 104, and thus accessed via any of a corresponding set of RATs 112 of the UE 102. To facilitate effective selection of a suitable RAT 112 for support of a service requested by one or more local processes and suitable configuration and control of the selected RAT 112, in at least one embodiment the UE 102 includes a RAT control stack 332 (identified as "CTL 332" in FIG. 3) that includes executable instructions that, when executed by the general processor 302, manipulate the general processor 302 to provide the RAT operational control scheme 114 and one or more of its modes of operation as described herein. In some embodiments, the RAT control stack 332 is implemented as part of the OS 330 or other kernel, while in other embodiments the RAT control stack 332 can be implemented as, for example, a driver or other software for controlling the radio resource 306. As noted above, examples of various modes utilized in accordance with the RAT operational control scheme 114, and thus implemented by the RAT control stack 332 via the hardware components of the UE 102, are described below with reference to FIGS. 4-11.

Figure 4:
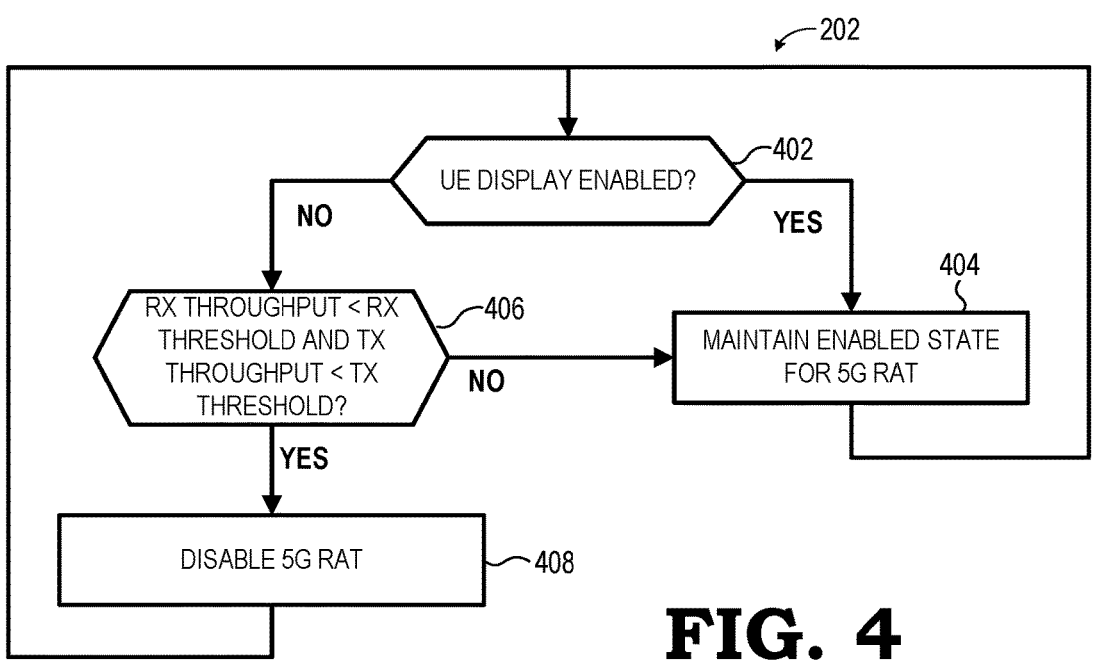
FIG. 4 is a flow chart illustrating a screen-state-based RAT selection mode of the RAT operational control scheme in accordance with some embodiments.

FIG. 4 illustrates, in flow chart form, an example implementation of the screen-state-based RAT selection mode 202 in accordance with some embodiments. In a multimodal implementation, the UE 102 typically operates to perform periodic measurements on multiple RATs 112 (such as the RATs 112-1 and 112-2 of FIG. 1), and in instances where a particular RAT 112 supports multiple frequencies, to perform period measurements on some or all of these multiple frequencies. These measurements can include, for example, Reference Signal Received Power (RSRP) measurements, Received Signal Strength Indicator (RSSI) measurements, Reference Signal Received Quality (RSRQ) measurements, Signal-to-Noise and Interference Ratio (SNIR) measurements, and the like.

When the UE 102 is relatively inactive (such as, for example, when being carried in the user's pocket or bag), performing such measurements for the 5G RAT 112-1 can unnecessarily consume power without providing much corresponding benefit. One often-reliable indicator of the current and near-future enabled/disabled state of the UE 102 is whether a display of the UE 102 is enabled or disabled (that is, turned on or turned off). In particular, a disabled display often is a strong indicator that the UE 102 is unlikely to need the improved data throughput provided by the 5G RAT 112-1. Accordingly, as an initial consideration for mode 202, at block 402 the RAT control stack 332 ascertains the current state of the display of the UE 102. If the display is enabled, then at block 404 the RAT control stack 332 either configures the 5G RAT 112-1 to an enabled state (that is, "turns on" the 5G RAT 112-1) if disabled, or if already in an enabled state, continues to maintain the 5G RAT 112-1 in an enabled state.

The display being disabled is suggestive, but not dispositive, that the capabilities of the 5G RAT 112-1 are not currently needed. In some instances, the UE 102 may be executing local processes in the background which may still require one or both of uplink capacity and downlink capacity for a given service even while the UE 102 is not in active use by the user. Accordingly, when the display has an inactive state at block 402, then at block 406 the RAT control stack 332 ascertains the current receive (RX) throughput and transmission (TX) throughput off the local processes and compares these throughputs to an RX threshold and a TX threshold, respectively. The RX and TX throughputs can be measured as instantaneous throughputs, as average throughputs over some indicated sliding window, and the like. The RX and TX thresholds can be set in any of a variety of manners. To illustrate, in some embodiments, the RX and TX thresholds can be fixed and set by a supplier or user of the UE 102 or set by a network operator. In other embodiments, the RX and TX thresholds can be set relative to current throughput capacities reported by the RAN 104-1 via the gNB 110-1. To illustrate, the RX and TX thresholds can be set to, for example, 25% of the reported RX and TX capacities.

In the event that both the RX throughput is less than the specified RX threshold and the TX throughput is less than the specified TX threshold, then at block 408 the RAT control stack 332 determines that the capabilities of the 5G RAT 112-1 will not be needed to support the current activity of the UE 102 in its screen-off state and thus configures the 5G RAT 112-1 to a disabled state (that is, "turns off" the 5G RAT 112-1). The disablement of the 5G RAT 112-1 thus can lead to the UE 102 switching to the use of the 4G LTE RAT 112-2 to access the 4G LTE RAN 104-2 to support the RX and TX data requirements for the background local processes, or in some embodiments may lead the UE 102 to temporarily disable wireless access for the background processes entirely. However, in the event that either or both of the RX throughput exceeding the specified RX threshold or the TX throughput exceeding the specified TX threshold, then the RAT control stack 332 turns to enabling the 5G RAT 112-1, or maintaining an already-enabled 5G RAT 112-1 in the enabled state, at block 404.

Figure 5:
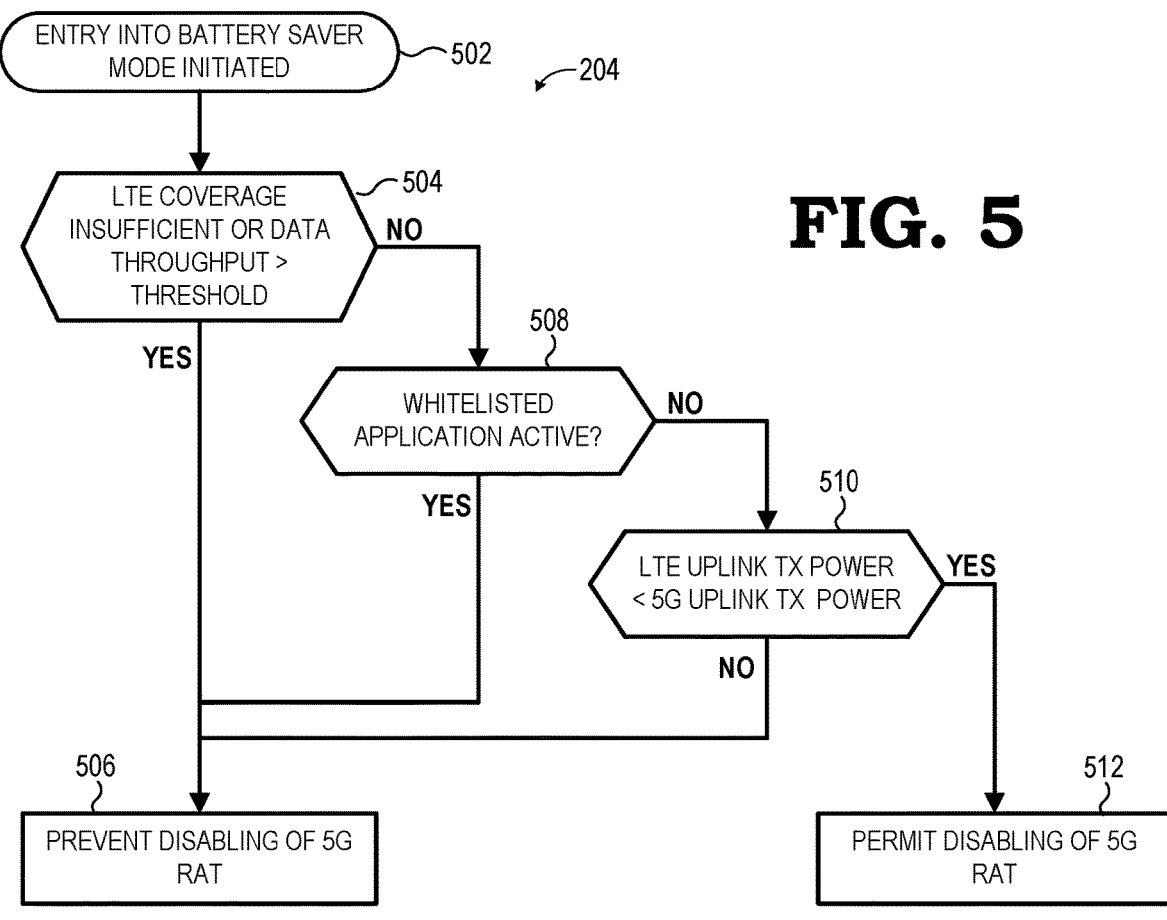
FIG. 5 is a flow chart illustrating an enhanced battery saver mode of the RAT operational control scheme in accordance with some embodiments.

FIG. 5 illustrates, in flow chart form, an example implementation of the enhanced battery saver mode 204 in accordance with some embodiments. As is often found in many mobile devices, the OS 330 of the UE 102 may offer one or more "battery saver modes" in which various operational characteristics of the UE 102 are modified to provide for substantial battery savings. These modifications can include, for example, setting an upper bound on utilized capacity of the general processor 302, an upper bound on display brightness, an upper bound on RAT measurement frequencies, a limitation on the particular configuration of a RAT (e.g., preventing operation in Frequency Range 2 (FR2) but permitting operation in Frequency Range 1 (FR1)), and the like. While entering such a battery saving mode at the UE 102 often reduces power consumption and thus extends the duration that the UE 102 can operate on the current battery charge, the resulting performance degradations can excessively impact the software applications 331 executed at the UE 102, particularly with respect to the available uplink and downlink bandwidths via the 5G RAT 112-1, which is presumed to typically provide higher throughput and lower latency at the cost of higher power consumption. Accordingly, the enhanced battery saver mode 204 operates to provide a decisioning process when entering a battery saving mode to consider whether to permit the 5G RAT 112-1 to be disabled when entering the battery saver mode.

To that end, this mode is initiated with an indication that the OS 330 or other component of the UE 102 is initiating entry into a battery saver mode at block 502. In response to this indication, the RAT control stack 332 determines whether any of at least three network-related conditions are present and, if so, signals the OS 330 to either permit or prevent disablement of the 5G RAT 112-1 when entering the battery saving mode. For ease of illustration, these three conditions are depicted in FIG. 5 as a chain of conditions, but it will be appreciated that these conditions are independent and thus can be considered concurrently or in an order different than the example order illustrated.

One such condition is represented by block 504, at which the RAT control stack 332 determines whether the alternative RAT, that is, the 4G LTE RAT 112-2, is capable of adequately supporting the data throughput needs of the UE 102 while in battery saving mode. Accordingly, the RAT control stack 332 determines whether the coverage provided by the 4G LTE RAT 112-2 is insufficient or whether the uplink and downlink throughputs provided by the other RAT meet at least minimum respective thresholds. The determination of the sufficiency of coverage of the 4G LTE RAT 112-2 can be based on comparison of one or more measurements to corresponding thresholds. Such measurements indicative of coverage can include, for example, RSSI, RSRQ, or SNIR measurements, Physical Broadcast Channel (PBCH) bit error rate, and the like. The one or more throughput thresholds can be predefined by a supplier or user of the UE 102 or a network operator associated with the 4G LTE RAN 104-2, based on historical analysis, based on the current needs of background processes expected to be running while in battery saver mode, and the like. In at least one embodiment, this threshold is considered to represent a relatively-impaired throughput, such as approximately 2 megabits-per-second (Mbps) or so. In the event that the LTE coverage is insufficient and a data throughput threshold is not met, then at block 506 the RAT control stack 332 determines that continued availability of the 5G RAT 112-1 is appropriate and thus signals the OS 330 to prevent the disablement of the 5G RAT 112-1 while the UE 102 is in the battery saving mode.

Otherwise, at block 508 the RAT control stack 332 considers whether there are any executing software applications 331 that are tightly coupled to the 5G RAT 112-1, either because the user, a provider, a network operator or other entity authorized such software applications 331 to use the 5G RAT 112-1 all of the time or because such software applications 331 rely on a particular service or performance characteristics that can be provided via the 5G RAT 112-1 and associated 5G RAN 104-1. Any such software application 331 is referred to herein as a "whitelisted application". If the RAT control stack 332 determines that there are one or more whitelisted applications currently executing at the UE 102, then at block 506 the RAT control stack 332 determines that continued availability of the 5G RAT 112-1 is appropriate and thus signals the OS 330 to prevent the disablement of the 5G RAT 112-1 while the UE 102 is in the battery saving mode.

One advantage that a 4G RAT often has over a 5G RAT is reduced uplink power consumption at lower bandwidths. However, in some circumstances the opposite is true. To illustrate, the UE 102 may be relatively distant from the closest eNB 110-2 while relatively close to the nearest gNB 110-1 and thus the 4G LTE RAT 112-2 may exhibit a larger uplink transmission power consumption than the 5G RAT 112-1 for an uplink throughput supportable by 4G LTE. In such instances, the 5G RAT 112-1 would be the lower power option. Accordingly, at block 510 the RAT control stack 332 measures and compares the current power consumption rates required for uplink transmission by the 5G RAT 112-1 and the 4G LTE RAT 112-2, and if the 4G LTE RAT 112-2 has an uplink transmission power consumption rate less than that of the 5G RAT 112-1, then at block 506 the RAT control stack 332 determines that continued availability of the 5G RAT 112-1 is appropriate and thus signals the OS 330 to prevent the disablement of the 5G RAT 112-1 while the UE 102 is in the battery saving mode. Further, in some embodiments, the RAT control stack 332 can disable the 4G LTE RAT 112-2 in view of this result, and thus cause all cellular network data transmissions to be conducted via the 5G RAT 112-1 while the UE 102 is in the battery saving mode.

However, in the event that the LTE coverage is sufficient and the data throughputs of the 4G LTE RAT 112-2 are above the minimum thresholds, no whitelisted applications are currently being executed, and the LTE uplink transmission power rate is less than the 5G uplink transmission power rate, then at block 512 the RAT control stack 332 determines that it would be appropriate to disable the 5G RAT 112-1 during the battery saver mode and signals the OS 330 to permit disablement of the 5G RAT 112-1 when entering the battery saving mode accordingly.

Figure 6:
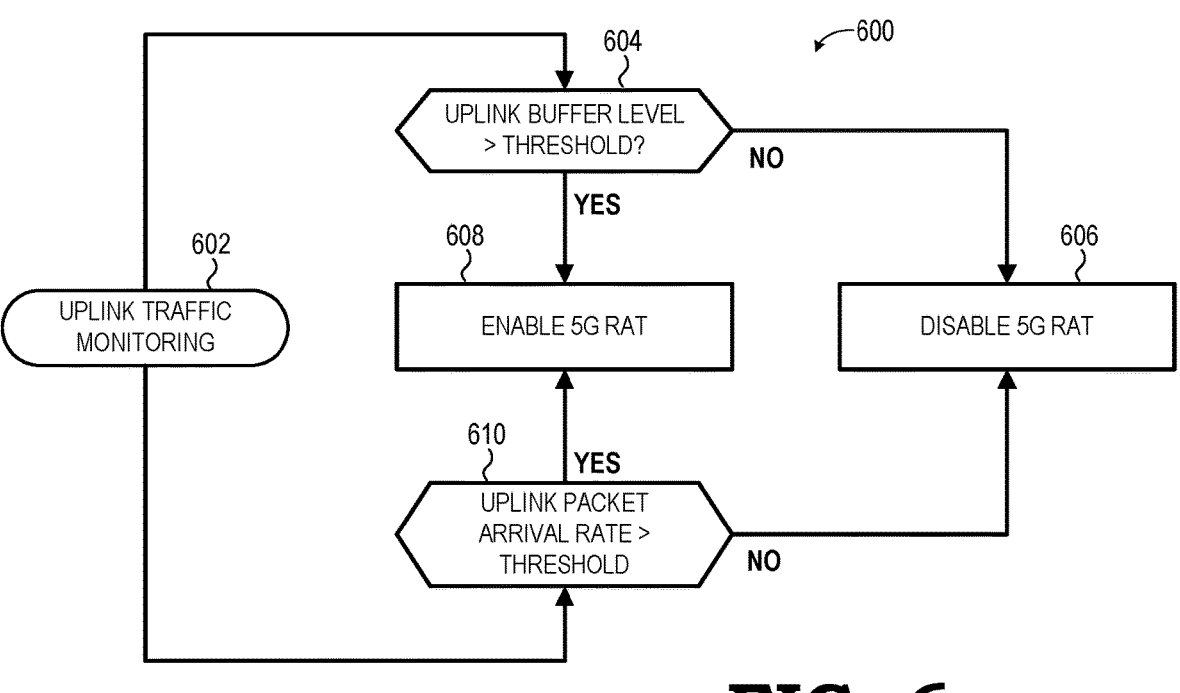
FIGS. 6-8 are flow charts illustrating a traffic pattern learning control mode of the RAT operational control scheme in accordance with some embodiments.
Figure 8:
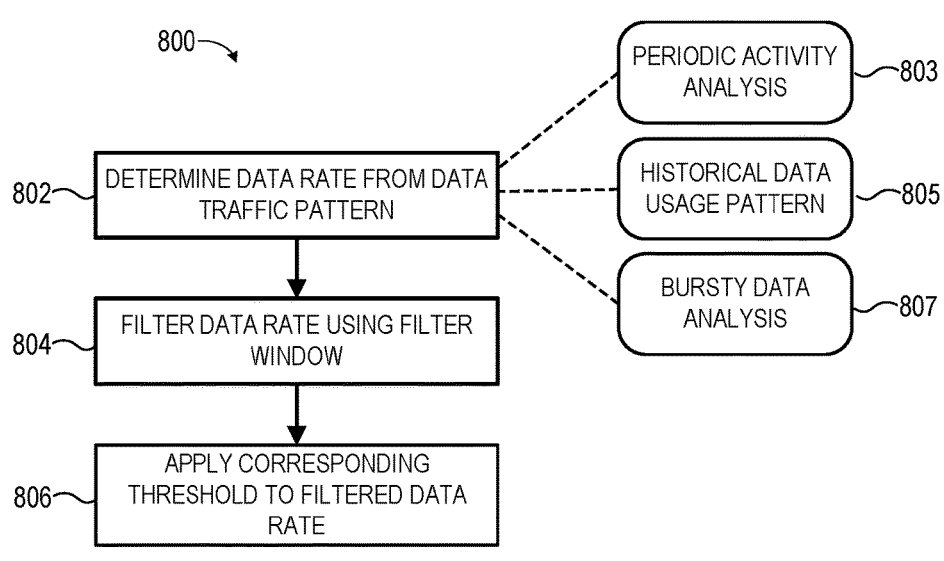
Figure 7:
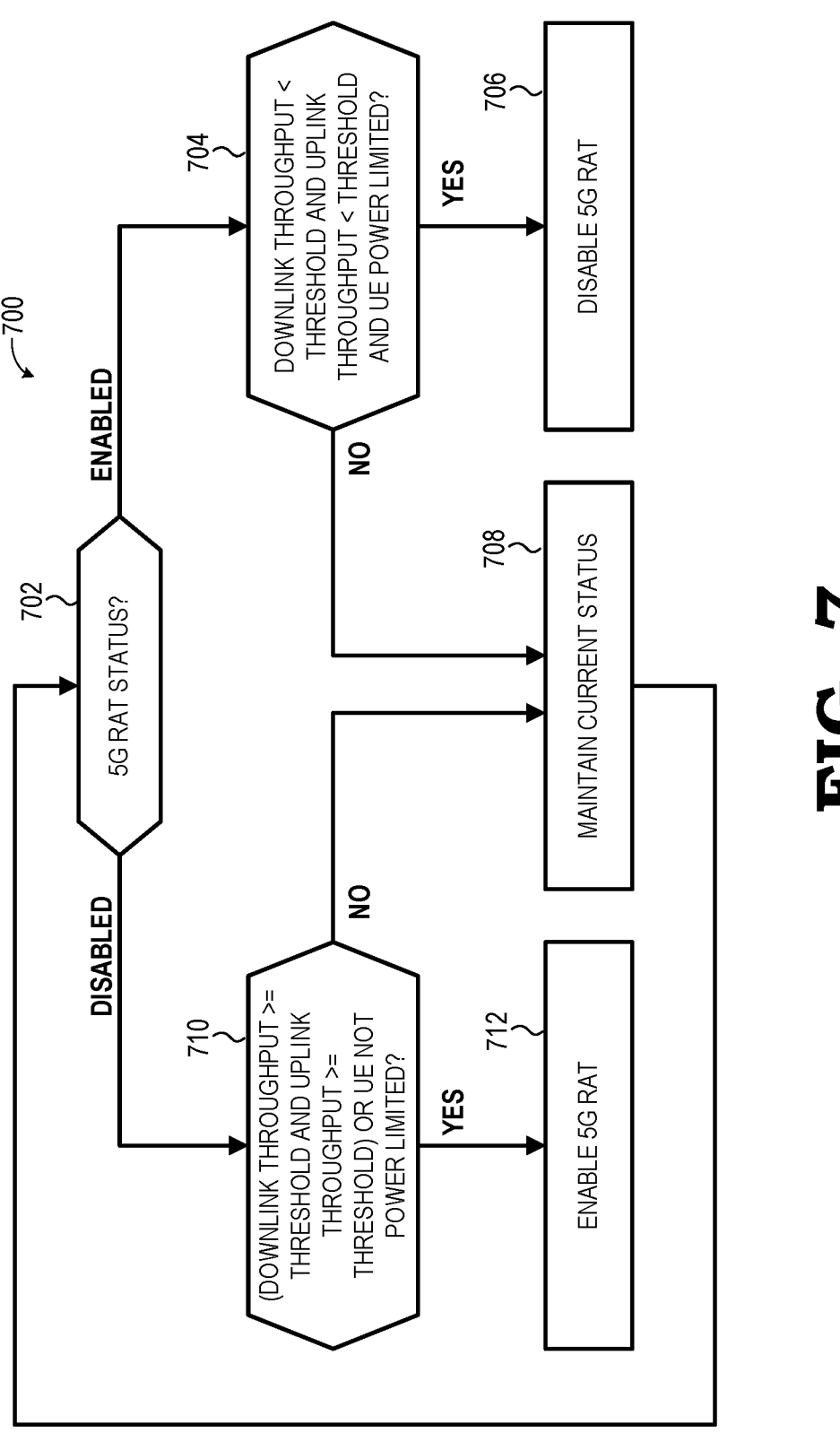

FIGS. 6-8 together illustrate, in flow chart form, an example implementation of the traffic pattern learning control mode 206 in accordance with some embodiments. In particular, FIG. 6 illustrates a method for selectively enabling or disabling the 5G RAT 112-1 based on uplink conditions, FIG. 7 illustrates a method for selectively enabling or disabling the 5G RAT 112-1 based on both uplink and downlink conditions, and FIG. 8 illustrates a method for using data traffic pattern analyses to estimate or predict a data throughput rate and then to filter the data throughput rate for comparing the result to a threshold as found in the methods of FIGS. 6 and 7.

Turning now to FIG. 6, the illustrated method 600 initiates at block 602 with the RAT control stack 332 monitoring the uplink data traffic being conducted by the UE 102. In some embodiments, the UE 102 employs an uplink buffer to buffer uplink data traffic from the one or more software applications 331 executing at the UE 102. Thus, input to this buffer is dictated by the uplink traffic arrival rate. Conversely, the data in the buffer is reduced each time the eNB 110-2 of the 4G LTE RAN 104-2 grants the UE 102 an uplink resource grant for transmitting a data packet. Accordingly, the current fill state of the uplink buffer of the UE 102 is indicative of whether the 4G LTE RAT 112-2 is sufficient to support current uplink throughput requirements of the UE 102. Thus, at block 604 the RAT control stack 332 compares the current uplink buffer level with a corresponding threshold (e.g., 50% or some other percentage of the buffer capacity) and if the threshold is not met, then at block 606 the RAT control stack 332 can disable the 5G RAT 112-1. However, if the threshold is exceeded, then at block 608 the RAT control stack 332 enables the 5G RAT 112-1 (or maintains the 5G RAT 112-1 in an enabled state) so that the UE has sufficient uplink capacity to clear the uplink buffer. Concurrently, at block 610 the RAT control stack 332 can monitor the uplink packet arrival rate from each software application 331 and compare the current rate to a specified threshold (e.g., 20 milliseconds). If the uplink packet arrival rate from a software application 331 is lower than a specified threshold, this is an indication that the software application 331 is latency-sensitive and, in response, the RAT control stack 332 enables the 5G RAT 112-1 at block 608 (if not already enabled). Otherwise, the software application 331 is deemed as not particularly sensitive to latency, and thus the RAT control stack 332 can disable the 5G RAT 112-1 at block 606. Note that in the flow of FIG. 6, there could be situations in which the comparison performed at block 604 and the comparison performed at block 610 could lead to opposite actions—one comparison indicating that the 5G RAT 110-1 should be enabled while the other comparison indicating that the 5G RAT 112-1 should be disabled. In such instances, the default resolution is to enable the 5G RAT 112-1.

Turning next to FIG. 7, the illustrated method 700 initiates at block 702 with the RAT control stack 332 determining the current status of the 5G RAT 112-1. If enabled, then at block 704 the RAT control stack 332 determines whether each of the following three conditions is met: (1) the downlink throughput of the UE 102 is less than a specified threshold, (2) the uplink throughput of the UE 102 is less than a specified threshold, and (3) the UE 102 is power limited; that is, the UE is not connected to a wall charger or other power outlet, and thus is relying solely on battery power. If all three of these conditions are met, then at block 706 the RAT control stack 332 concludes that the 5G RAT 112-1 is not required to meet the current needs of the UE 102 and thus disables the 5G RAT 112-1 to conserve power. Otherwise, if one or more of these three conditions is not met, then at block 708 the RAT control stack 332 concludes that either the bandwidth provided by the 5G RAT 112-1 is needed to satisfy the current throughput demands of the UE 102 or concludes that the amount of power available does not require power-conservation action, and thus maintains the current enablement status of the 5G RAT 112-1.

Returning to block 702, if the current status of the 5G RAT 112-1 is disabled, then at block 710 the RAT control stack 332 determines whether both the downlink throughput and uplink throughput exceed their corresponding thresholds or whether the UE 102 currently is not power limited (that is, relying solely on battery power). If either condition is met, then at block 712 the RAT control stack 332 determines that it would be appropriate to utilize the 5G RAT 112-1 under the circumstances and thus enables the 5G RAT 112-1. Otherwise, if the threshold conditions are not met and the UE 102 currently is power limited, then at block 708 the RAT control stack 332 maintains the 5G RAT 112-1 in its current disabled state.

In the methods 600 and 700 described above, the RAT control stack 332 relies on one or more comparisons of a data throughput (that is, a data rate) of the UE 102 with a corresponding threshold. In some embodiments, this data throughput can be a current instantaneous data throughput. However, use of the current data throughput may not provide an accurate representation of the near-future behavior and needs of the UE 102. Moreover, use of an instantaneous data throughput may result in triggering the enablement or disablement of the 5G RAT 112-1 too early or too late. Accordingly, method 800 illustrates an approach to more optimally smooth the data rate curve and reduce the number of early or late triggers for enabling or disabling the 5G RAT 112-1 in the methods described herein.

Accordingly, at block 802 in FIG. 8 the RAT control stack 332 monitors the uplink and downlink behavior of the UE 102 to determine a data traffic pattern, and from this data traffic pattern determination, predict, or otherwise determine an appropriate representation of one or both of an uplink data rate or a downlink data rate. As represented by block 803, this analysis can include monitoring the operation of the software applications 331 for periodic network activities. To illustrate, the UE 102 may be configured to perform software updates within a certain time window any given day, and the RAT control stack 332 observes this behavior to predict a similar downlink requirement for the next time window. As represented by block 805, the data traffic pattern analysis can include an analysis of historical data usage patterns. This historical data usage pattern can be correlated relative to either or both of time and location. To illustrate, a user may use the UE 102 to browse websites at lunch every workday, and this may be observed as a historical data usage pattern corresponding to lunch hour during workdays and at a location associated with the user's workplace. As represented by block 807, the RAT control stack 332 may observe that a certain software application 331 has a "bursty" downlink data usage pattern. For example, in a video streaming application, a streaming session can include an initial downlink burst in which video data is downloaded in a burst and buffered when the downlink bandwidth is sufficiently high, and then subsequent downlink bursts are performed as the amount of buffered video data runs low. Such bursty behavior may obfuscate the actual steady-state downlink requirements. For example, for video streaming at a 4K resolution, 25 Mbps typically is sufficient, but a bursty buffering scheme may result in transitory periods at which the downlink rate greatly exceeds 25 Mbps. In such instances, the RAT control stack 332 can predict such bursty usages and instead utilize an average downlink rate rather than the peak downlink rate during a burst.

In addition to using data traffic pattern analysis to more accurately predict the "real" current data rate, it will be appreciated that the current data rate still may not reflect the data rate in the near future, which can lead to the RAT control stack 332 inadvertently disabling the 5G RAT 112-1 when it should have remained enabled, or vice versa. Accordingly, rather than use a single data rate measurement, in some embodiments the RAT control stack 332 applies a filter window over a set of previous data rate values to generate a filtered data rate. To illustrate, in one embodiment, the RAT control stack 332 utilizes a filter window of a configurable duration (e.g., 200 ms) and a filter coefficient A, where A=1/power (2,k), k={0, VAR}. In this case, a filtered data rate value can be determined using the expression: Fn=(1−A)*Fn−1+A*Fc, where Fn is the current filtered data rate value, Fn−1 is the filtered data rate value from the previous iteration, and Fc is the absolute, or instantaneous, current data rate (measured or predicted). As represented by block 806, the resulting filtered data rate value can be compared to the corresponding threshold as found in the methods described herein, such as in, for example, the comparison of the downlink throughput (one embodiment of the filtered data rate) to its corresponding threshold at blocks 704 and 710 of method 700.

Figure 9:
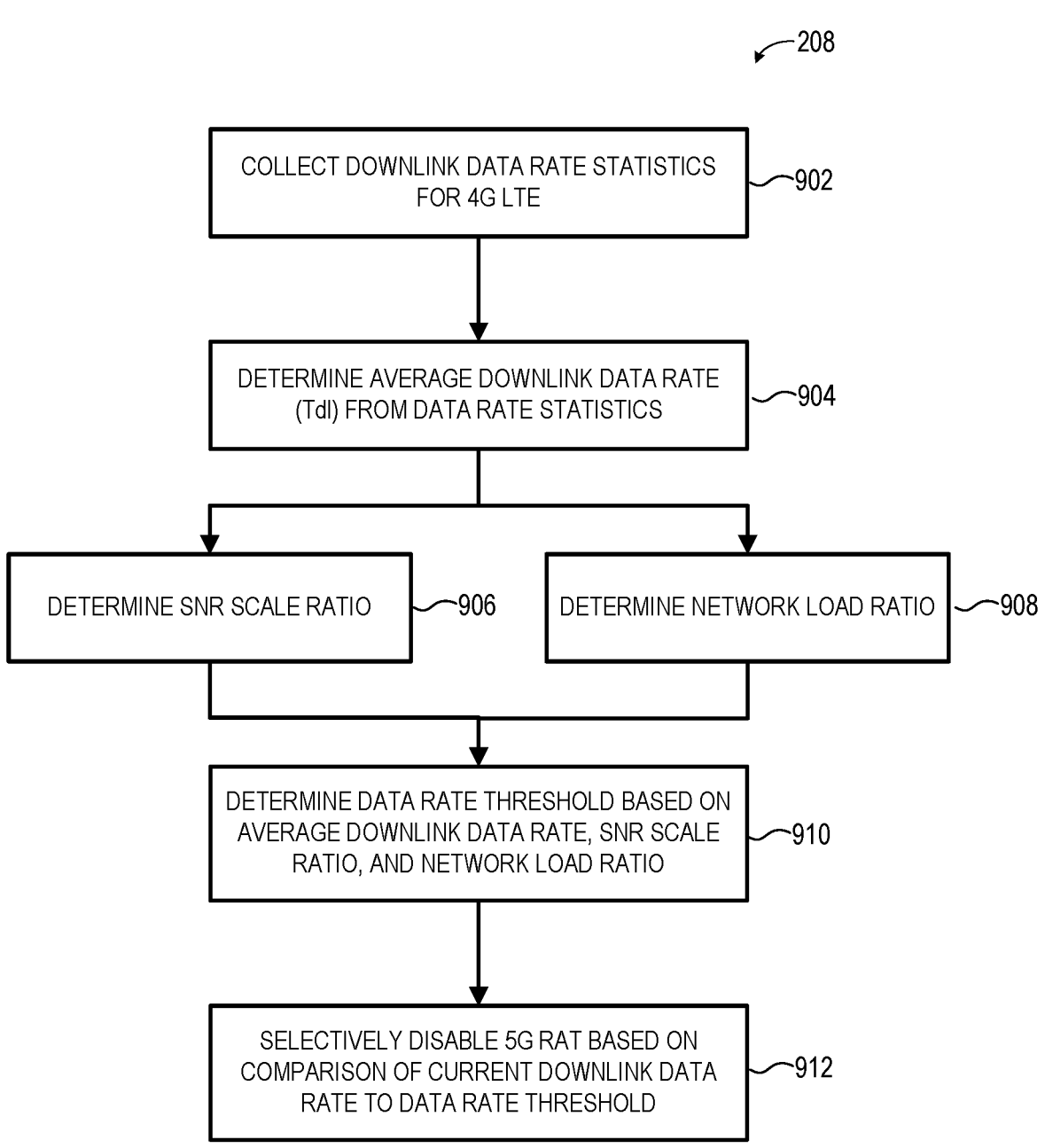
FIG. 9 is a flow chart illustrating an adaptive data rate thresholding mode of the RAT operational control scheme in accordance with some embodiments.

FIG. 9 illustrates, in flow chart form, an example implementation of the adaptive data rate thresholding mode 208 in accordance with some embodiments. In some embodiments, the UE 102 provides dual 4G-5G connectivity in which both the 5G RAT 112-1 and the 4G LTE RAT 112-2 can be used concurrently to provide a total data throughput that is roughly the sum of the individual throughputs of each of the RATs 112. This dual-connectivity mode often is referred to as Evolved-Universal Terrestrial Radio Access-New Radio Dual Connectivity (ENDC).

While utilizing both RATs 112 concurrently can provide throughput and latency benefits, in many circumstances the latency and throughput benefits of this configuration do not justify the additional power consumption. Many dual-connectivity UEs thus seek to selectively disable the 5G RAT when not needed. However, when the deployed algorithm disables the 5G RAT too early, a poor user experience often results, while disabling the 5G RAT too late often results in excessive power consumption. Accordingly, a simplistic approach would be to obtain an accurate estimation of the data rate provided by the 4G RAT and base the threshold for disabling the RAT based on this estimation. However, the accuracy of this estimation is based on a number of variables, including the number of component carriers allocated to the UE, the number of resource blocks (RBs) and layers granted to the UE, the modulation and coding scheme (MCS) selected, the signal-to-noise ratio (SNR), and the like. Moreover, estimating these parameters often is a challenge due to the typically wide variety of deployments in terms of component carriers (CCs), cell radius, presence of interference, operator capabilities, and the like. As such, the development of a general downlink data estimate for use in determining the threshold for disabling the 5G RAT typically cannot be universally applied.

Accordingly, in the adaptive data rate thresholding mode 208 the UE 102 operates to determine threshold(s) to enable and disable the 5G RAT 112-1 based on metrics collected from a number of sources and which are scaled based on both the particular SNR of the UE 102 and the current network load. Thus, at block 902 a supplier or user of the UE 102, an operator of one or both of the RANs 104, or another entity obtains 4G LTE downlink data rate statistics from multiple sources. This can include key performance indicators (KPIs) or other downlink data rate indicators across different network operators, different vendors, for different markets or regions, for different 4G LTE-enabled device models, and the like. Further, in at least some embodiments, these statistics are categorized by particular time span (e.g., particular time slots, night vs. day, workday vs. evening, and the like). Further, in some embodiments, the entity collects 4G LTE data rates as compiled and reported by various research agencies, which also may be categorized as above if the organization of the data permits.

With this raw data obtained, at block 904 the entity processes the 4G LTE downlink data rate statistics to determine an average downlink data rate (referred to herein as "Tdl") for 4G LTE. In some embodiments, a single, invariable Tdl is determined, regardless of (that is, independent of) qualifying characteristics. In other embodiments, a Tdl is determined for each combination of characteristics of a set of characteristics. For example, a different Tdl may be determined for each hour of the day, a different Tdl may be determined for each separate region, a different Tdl may be determined for each hour of the day in each of a plurality of regions, and the like. The UE 102 is then configured to store the pertinent one or more average downlink data rate values Tdl in, for example, a basic input-output system (BIOS) or other configuration read-only memory (ROM).

While in operation and in anticipation of a need to determine whether to selectively disable the 5G RAT 112-1 while in dual-connectivity mode, the UE 102 determines two current parameters: a SNR scale ratio at block 906 and a network load ratio at block 908. To determine the SNR scale ratio, the RAT control stack 332 measures the current SNR of the 4G LTE RAT 112-2, and using the current SNR determines an SNR scale ratio based on the expression: SNR scale ratio=Sc/Smax, where Sc represents the current SNR and Smax represents the maximum SNR possible for the 4G LTE RAT 112-2.

[0001] It may be observed that when the broadband RSSI and the inband RSSI of the 4G LTE RAT 112-2 are comparable, this is a strong indicator that the 4G LTE cell (that is, the eNB 110-2) is only lightly loaded. Conversely, when the broadband RSSI is smaller than the inband RSSI, this is a strong indicator that there are many UEs connected to the 4G LTE cell, which causes higher inband noise, and thus indicates that the cell is relatively highly loaded. Thus, to determine the network load ratio, in one embodiment the RAT control stack 332 uses the current broadband RSSI and the current inband RSSI as measured by the 4G modem 310-1 and using the expression: network load ratio=broadband RSSI/inband RSSI.

At block 910, the RAT control stack 332 determines the average downlink data rate (Tdl) for 4G LTE that is associated with the current parameters of the UE 102 (e.g., the Tdl associated with the hour of the current time and the current region in which the UE 102 is located), or if only a single, universal Tdl was determined, this single Tdl, and then scales this average data rate by the SNR scale ratio and the network load ratio using, for example, the expression: Tdl'=Tdl*SNR scale ratio*network load ratio, where Tdl' represents the resulting scaled average downlink data rate. That is, the RAT control stack 332 takes the "universal" average downlink data rate Tdl and scales it based on both the current observed SNR ratio and the current observed network load ratio so that the resulting scaled average downlink data rate Tdl' is adapted to reflect the current 4G LTE conditions observed by the UE 102.

At block 912, when in the dual-connectivity mode the RAT control stack 332 monitors the total downlink data rate obtained by both the 4G LTE RAT 112-2 and the 5G RAT 112-1 and if the total downlink data rate is less than the scaled average downlink data rate Tdl' over a specified sliding window (e.g., 200 ms), then the RAT control stack 332 disables the 5G RAT 112-1. Conversely, when in an LTE-only mode, the RAT control stack 332 monitors the LTE downlink throughput and if this throughput is higher than a threshold B*Tdl' (where B is a constant between, for example, 0.5 and 1.0) over a specified sliding window, then the RAT control stack 332 enables the 5G RAT 112-1.

Figure 10:
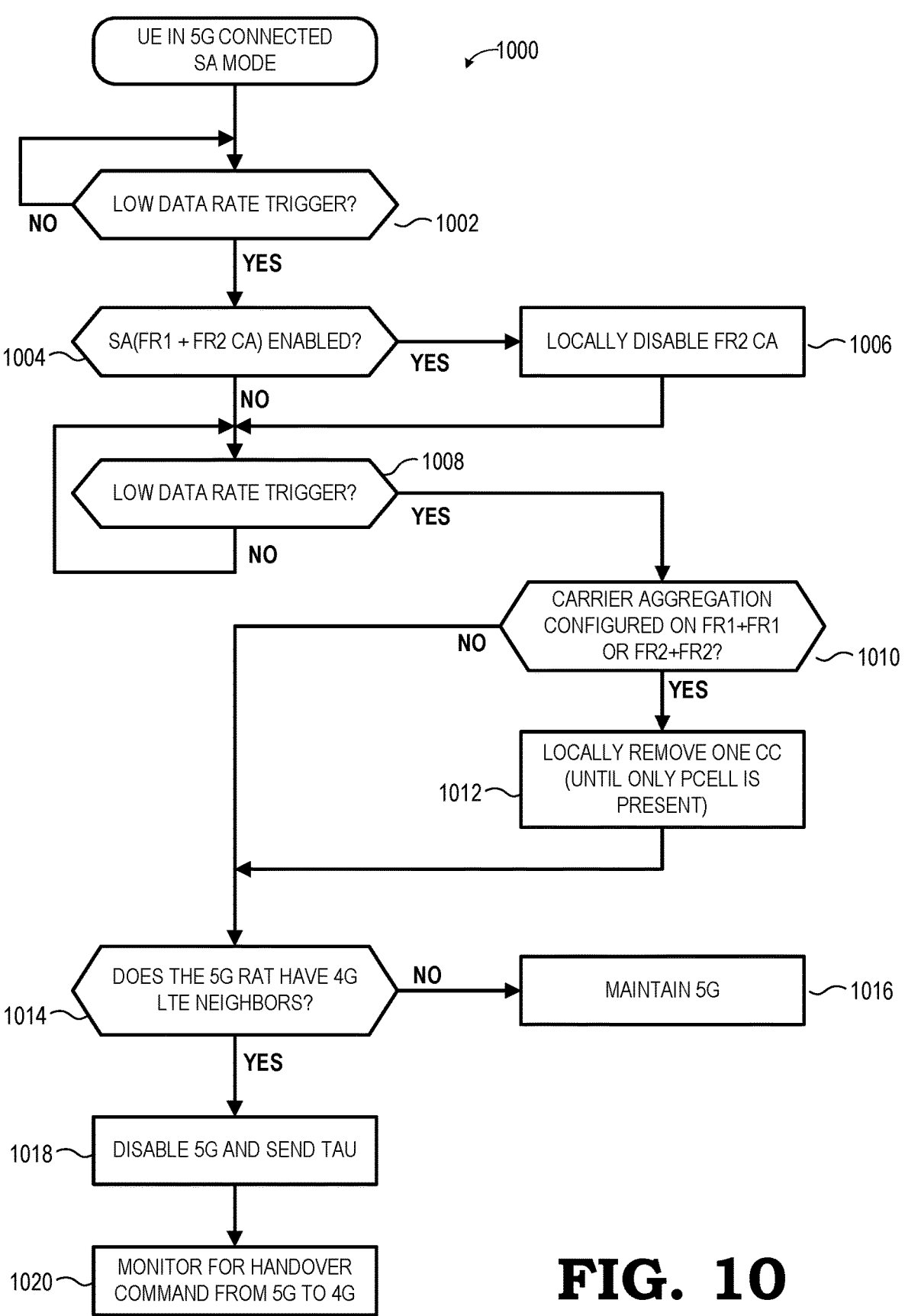

FIGS. 10 and 11 together illustrate, in flow chart form, an example implementation of the adaptive RAT scaling mode 210 in accordance with some embodiments. The 5G NR standard provides for two frequency bands: FR1 (also referred to as "Sub6") and FR2 (the aforementioned mmWave band), with FR2 typically consuming more power while providing a higher throughput than FR1. Further, rather than operating separately, these frequency bands can be employed in carrier aggregation in which one or more carriers are combined into one data channel, with each carrier combination referred to as a "component carrier" (CC). This carrier aggregation can be employed intra-band with carriers within only one of the frequency bands (that is, FR1+FR1 or FR2+FR2) implemented in a corresponding CC, or intra-band, with at least one carrier from each of the two frequency bands (that is, FR1+FR2) implemented in a corresponding CC. For the following, the 5G RAT 112-1 of the UE 102 is capable of these modes of carrier aggregation. Also for the following, the UE 102 is capable of ENDC operation, as well as operating in either 5G standalone (SA) mode (that is, where the 5G RAT 112-1 is used for both the user plane and the control plane operations) or 5G non-standalone (NSA) mode (that is, where the 5G RAT 112-1 is used for user plane operations, but the 4G LTE RAT 112-2 is used for control plane operations). The adaptive RAT scaling mode 210 thus is configured to opportunistically enable and disable these various modes of operation so as to provide finer control of 5G capabilities and a more optimal balance of power and performance.

Turning to FIG. 10, the depicted flowchart illustrates a method 1000 of the mode for selectively enabling and disabling various modes with the UE 102 initially connected to the 5G RAN 104-1 in a 5G SA mode. After entering the 5G SA mode, at block 1002 the RAT control stack 332 monitors for a low data rate trigger indicating an opportunity to disable one or more 5G capabilities so as to reduce power consumption. In one embodiment, this low data rate trigger is instantiated when the ratio of the downlink data rate of the 5G RAT 112-1 while in SA mode (denoted $5G_{SA\_DL}$) to the current Link Capacity Estimation (LCE) of the 5G RAT 112-1 in this mode (denoted $LCE_{5G\_SA\_DL}$) is less than a specified threshold "A"; that is, when $5G_{SA\_DL}/LCE_{5G\_SA\_DL} < A$.

In response to the low data rate trigger, at block 1004 the RAT control stack 332 determines whether the UE 102 is operating in the SA mode with inter-band carrier aggregation enabled (that is, FR1+FR2 CA). If so, then at block 1006 the RAT control stack 332 locally disables the use of frequency band FR2 for carrier aggregation by declaring a radio link failure (RLF) to the 5G RAN 104-1. As used herein, the declaration of an RLF to opportunistically disable an aspect of the 5G mode that is actually operational is referred to as a "virtual RLF" or "vRLF". Alternatively, in some embodiments, rather than disable FR2 entirely for inter-band carrier aggregation, the RAT control stack 332 can disable one CC in FR2 at a time until the low data rate trigger is no longer present.

At block 1008, the RAT control stack 332 returns to monitoring for the low data rate trigger. When instantiated (or if the disabling of the frequency band FR2 for carrier aggregation does not clear the trigger), at block 1010 the RAT control stack 332 determines whether the 5G RAT 112-1 is configured to support intra-band carrier aggregation. If so, then at block 1012 the RAT control stack 332 disables one intra-band CC via a vRLF declaration and then checks for the continued presence of the low data rate trigger. If so, the process of disabling one intra-band CC and then checking for the low data rate trigger repeats one or more times until either the low data rate trigger is absent or only the primary cell (Pcell) is present in the corresponding frequency band.

The method 1000 then moves to block 1014, whereupon the RAT control stack 332 determines whether the current 5G carriers employed have any neighbors in the 4G LTE frequency spectrum. If not, then at block 1016 the RAT control stack 332 maintains the 5G RAT 112-1 in its enabled state. Otherwise, at block 1018 the RAT control stack 332 disables the 5G RAT 112-1 and causes the UE 102 to send a tracking area update (TAU) message with updated capabilities to the 4G LTE RAN 104-2. In response, the 4G LTE RAN 104-2 should initiate a handover, and thus at block 1020 the RAT control stack 332 monitors for a 5G-to-4G handover command from the 4G LTE RAN 104-2 to complete the switch to an entirely 4G LTE mode.

Turning to FIG. 11, the depicted flowchart illustrates a method 1100 of the mode for selectively enabling and disabling various modes with the UE 102 initially connected to only the 4G LTE RAN 104-2 in a 4G only mode. Thus, at block 1102 the RAT control stack 332 monitors for a high data rate trigger indicating a need to enable one or more 5G capabilities so as to provide sufficient throughput. In one embodiment, this high data rate trigger is instantiated when the ratio of the downlink data rate of the 4G LTE RAT 112-2 (denoted $4G_{DL}$) to the current Link Capacity Estimation (LCE) of the 4G RAT 112-2 (denoted $LCE_{4G\_DL}$) is less than a specified threshold "B"; that is, when $4G_{DL}/LCE_{4G\_DL} < B$.

In response to the high data rate trigger, at block 1104 the RAT control stack 332 enables the 5G RAT 112-1 and sends the network a TAU message to enable 5G capabilities for the UE 102. Typically, because the UE 102 has not fully connected to the 5G RAN 104-1 at this point, the current capabilities of the network are unknown, and thus the UE 102 enables all of the aforementioned 5G capabilities (SA mode, NSA mode, carrier aggregation, ENDC, etc.). In response to the TAU message, at block 1106 the 5G RAN 104-1 will configure the 5G measurements for the UE 102 based on the configuration used in the location of the UE 102. At block 1108, the RAT control stack 332 determines the type of measurements the UE 102 has been configured for: FR1 only, FR2 only, FR1+FR2, or none (that is, the network has not configured the UE 102 for 5G operation).

If configured for measurements for FR1 only, then at block 1110 the UE 102 performs the appropriate measurements on FR1, provides a measurement report (MR) to the 5G RAN 104-1 via FR1, and in response, the network sends a handover command to configure the UE 102 to operate in 5G SA mode using FR1 only. Likewise, if configured for measurements for FR2 only, then at block 1112 the UE 102 performs the appropriate measurements on FR2, provides an MR to the 5G RAN 104-1 via FR2, and in response, the network sends a handover command to configure the UE 102 to operate in 5G SA mode using FR2 only. If configured for measurements for FR1 and FR2, then at block 1114 the UE 102 performs the appropriate measurements on FR1 and FR2, provides an MR to the 5G RAN 104-1 via either FR1 or FR2, and in response, the network sends a handover command to configure the UE 102 to operate in 5G SA mode using FR1 and FR2. If, however, the network fails to configure the UE 102 for measurements, then at block 1116 the RAT control stack 332 disables the 5G RAT 112-1 and configures the UE 102 to remain on the 4G LTE RAN 104-2 only.

Otherwise, assuming the UE 102 has been configured to operate in 5G SA mode in some capacity, at block 1118 the RAT control stack 332 monitors one or more incoming data rates for either uplink or downlink (or both) and determines whether an incoming data rate exceeds the estimated throughput that can be achieved by the UE 102 in 5G SA mode under the current conditions. If the estimated throughput is insufficient to support the data rate requirement represented by the one or more incoming data rates, then at block 1120 the RAT control stack 332 enables ENDC mode for the UE 102 and sends a TAU signal to the 5G RAN 102-1 to signal the network to configure the UE 102 for ENDC mode. In response, at block 1122 the network configures the UE 102 to perform the appropriate measurements via the 4G LTE RAT 112-2 for ENDC mode, and at block 1124 the UE 102 performs the measurements and sends an MR for the 4G LTE measurements to the network. At block 1126, the network configures the UE 102 to operate in the ENDC NSA mode, thus providing improved throughput capacity for the incoming data rate.

Yet another approach for reduced power consumption in the UE 102 can be based on uplink power consumption. In the approach outlined below, the following assumptions are made: the UE 102 and associated network are capable of switching between NSA and SA modes; the UE 102 and network are capable of supplementary uplink (SUL); the network is able to obtain the capabilities of the UE 102 through TAU messaging (e.g., a request to enable SUL, a request to change the radio link control (RLC) uplink path to 4G LTE, etc.); and the network will honor the TAU messaging and change the downlink/uplink transmission logic accordingly. With these assumptions, the flow of the approach is as follows:

1. If the UE 102 is in an NSA mode of operation and the UL path is on 5G and 5G uplink data rate (or buffer status) is lower than a certain threshold, the DL data rates are higher than a certain threshold, and the 5G uplink power is higher than a certain threshold, the UE 102 sends a Radio Resource Control (RRC) message to the network to request either SUL or a change the RLC uplink path to 4G LTE.

2. If the UE 102 is in an SA mode of operation and the 5G uplink data rate (or buffer status) is lower than the specified threshold, the DL data rates are higher than the specified threshold and the 5G uplink power is higher than a certain threshold, the UE 102 switches to an ENDC mode of operation and informs the network to request a UL path change to 4G LTE.

3. If the UE 102 is in either an SA or an NSA mode of operation and the 5G uplink data rate (or buffer status) and the DL data rates are lower than their specified thresholds, and the 5G uplink power is higher than the corresponding threshold, the UE 102 disables the 5G RAT 112-1 by sending updated capabilities through a TAU message to the network.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

A computer-readable storage medium includes any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for opportunistically configuring capabilities of a first radio access technology (RAT) of a user equipment implementing the first RAT and a second RAT, the method comprising:

responsive to detecting a low data throughput condition while the first RAT and second RAT are enabled, selectively disabling one or more capabilities of the first RAT, the one or more capabilities including at least one of an intra-band carrier aggregation capability, an inter-band carrier aggregation capability, or a component carrier; and responsive to a receive throughput exceeding a receive threshold or a transmit throughput exceeding a transmit threshold while the first RAT is disabled and the second RAT is enabled:

enabling the first RAT; and responsive to determining that a data rate requirement of the user equipment is greater than an estimated throughput of the first RAT, configuring the first RAT to operate in a dual-connectivity mode with the second RAT;

wherein at least one of the receive threshold or the transmit threshold is set relative to a throughput capacity of a first radio access network (RAN) accessed via the first RAT or of a second RAN accessed via the second RAT.

2. The method of claim 1, wherein selectively disabling one or more capabilities comprises selectively disabling an intra-band carrier aggregation capability.

3. The method of claim 1, wherein selectively disabling one or more capabilities comprises selectively disabling an inter-band carrier aggregation capability.

4. The method of claim 1, wherein selectively disabling one or more capabilities comprises selectively disabling a component carrier.

5. The method of claim 1, wherein the first RAT is a Fifth Generation New Radio (5G NR) RAT and the second RAT is a Fourth Generation Long Term Evolution (4G LTE) RAT.

6. A user equipment comprising:

at least one antenna array;

first and second modems coupled to the at least one antenna array, the first modem supporting a first radio access technology (RAT) and the second modem supporting a second RAT;

a processor coupled to the first and second modems; and a memory storing instructions configured to manipulate the processor to:

responsive to detecting a low data throughput condition while the first RAT and second RAT are enabled, configure the first modem to selectively disable one or more capabilities of the first RAT, the one or more capabilities including at least one of an intra-band carrier aggregation capability, an inter-band carrier aggregation capability, or a component carrier; and responsive to a receive throughput exceeding a receive threshold or a transmit throughput exceeding a transmit threshold while the first RAT is disabled and the second RAT is enabled:

configure the first modem to enable the first RAT; and responsive to determining that a data rate requirement of the user equipment is greater than an estimated throughput of the first RAT, configure the first RAT to operate in a dual-connectivity mode with the second RAT;

wherein at least one of the receive threshold or the transmit threshold is set relative to a throughput capacity of a first radio access network (RAN) accessed via the first RAT or of a second RAN accessed via the second RAT.

7. The user equipment of claim 6, wherein the processor is to configure the first modem to selectively disable one or more capabilities by configuring the first modem to selectively disable an intra-band carrier aggregation capability.

8. The user equipment of claim 6, wherein the processor is to configure the first modem to selectively disable one or more capabilities by configuring the first modem to selectively disable an inter-band carrier aggregation capability.

9. The user equipment of claim 6, wherein the processor is to configure the first modem to selectively disable one or more capabilities by configuring the first modem to selectively disable a component carrier.

10. The user equipment of claim 6, wherein the first RAT is a Fifth Generation New Radio (5G NR) RAT and the second RAT is a Fourth Generation Long Term Evolution (4G LTE) RAT.

* * * * *